(12) United States Patent
Kamishima

(10) Patent No.: US 6,529,370 B1
(45) Date of Patent: Mar. 4, 2003

(54) KEYBOARD SWITCH

(75) Inventor: Osamu Kamishima, Toyama (JP)

(73) Assignee: SMK Corporation, Tokyo (JP)

( * ) Notice: Subject to any disclaimer, the term of this patent is extended or adjusted under 35 U.S.C. 154(b) by 91 days.

(21) Appl. No.: 09/724,194

(22) Filed: Nov. 28, 2000

(30) Foreign Application Priority Data

Jun. 22, 2000 (JP) ........................................ 2000-187237

(51) Int. Cl.[7] ................................................. G06F 1/16
(52) U.S. Cl. ........................ 361/680; 200/5 A; 400/490
(58) Field of Search ........................ 400/490; 200/5 A; 361/680

(56) References Cited

U.S. PATENT DOCUMENTS

| | | | |
|---|---|---|---|
| 5,532,904 A | 7/1996 | Sellers | |
| 5,587,875 A | 12/1996 | Sellers | |
| 5,590,020 A | 12/1996 | Sellers | |
| 5,602,715 A | 2/1997 | Lempickie et al. | |
| 5,621,610 A | 4/1997 | Moore et al. | |
| 5,635,928 A | * 6/1997 | Takagi et al. | 341/22 |
| 5,654,872 A | 8/1997 | Sellers | |
| 5,677,826 A | 10/1997 | Sellers | |
| 5,790,370 A | * 8/1998 | Merkel | 361/680 |
| 5,874,696 A | * 2/1999 | Hayashi et al. | 200/5 A |

* cited by examiner

*Primary Examiner*—Darren Schuberg
*Assistant Examiner*—Anthony Edwards
(74) *Attorney, Agent, or Firm*—Darby & Darby

(57) ABSTRACT

A keyboard switch includes an improved interlock mechanism that actuates a switch sheet from a first position to a second position and correspondingly narrows a gap between a key top and the switch sheet. The interlock mechanism converts a rotary motion from a device lid to a linear motion for the switch sheet guided by a slider block slidably retained in a device case.

6 Claims, 9 Drawing Sheets

KEYBOARD SWITCH

BACKGROUND OF THE INVENTION

1. Field of the Invention

The present invention relates to a keyboard switch suitable for use in a notebook-type personal computer having a lid that closes to cover at least one key top. More particularly, the present invention relates to an improved keyboard switch that allows a cover-closing motion to move the key tops downward and allow the cover to easily close without undue ware.

2. Detailed Description of the Related Art

It is conventionally known to move key tops downward during a closing motion and accommodate a keyboard switch in a closed notebook-type personal computer.

Referring now to FIGS. 12 to 14, showing a conventional keyboard switch 100 as disclosed in the publication of Japanese Patent No. 2857353, includes a supporting plate 107 for supporting a large number of key tops 102. Each key top 102 is attached to a cross link 101. Keyboard switch 100 is included between a lid 115 and an equipment case 109 of a conventional notebook-type personal computer.

Cross link 101 includes a first link member 101a and a second link member 101b, each formed generally in the shape of the letter "U", and being rotatably linked together about an intermediate rotatable fulcrum (not shown). Cross link 101 guides key top 102 during motion in an up-and-down movement.

In the operational position shown in FIG. 13, a dome-like rubber elastic portion 114 is disposed below each key top 102 and serves as a return spring, pressing key top 102 upward in response to a key stroke. Elastic portion 114 abuts the bottom surface of a pressure-applying portion 106 formed at the intersection between first and second link members 101a, 101b.

Elastic portion 114 is integrally formed on a rubber sheet 104 superimposed on a switch sheet 103. Switch sheet 103, is located below elastic portion 114, and includes an integrally formed switch portion 103a. Rubber sheet 104 and switch sheet 103 are both flexible and are superimposed and generally laminated together forming a flexible sheet that is slidable along a guide rail 108 included in supporting plate 107. Switch sheet 103 and rubber sheet 104 are contactable with a return spring 118 and disposed between their end portions (not shown) and equipment case 109. The laminated flexible sheet 103 and rubber sheet 104 are loaded by return spring 118 with a force that tends to move them toward the left-hand portion in FIGS. 12 through 14.

In the operational position shown in FIGS. 12 and 13, when downward pressure is applied to key top 102 from above, key top 102 is guided by cross link 101 and is thereby moved downward and kept generally horizontal relative to equipment case 109 without being significantly inclined. As a result, pressure-applying portion 106 of key top 102 presses on and deforms elastic portion 114, so that an 'ON' operation of switch portion 103a is effected.

Equipment case 109 is rotatively coupled to lid 115 and rotates closed to protect key tops 102. A cam projection 117 projects outward from the inside of lid 115. Cam projection 117 has a top surface formed as an inclined plane. During a lid 115 closing-motion, the top surface of cam projection 117 presses on a side surface (not shown) of both switch sheet 103 and rubber sheet 104. As the top surface of cam projection 117 presses on the side surfaces of both switch sheet 103 and rubber sheet 104 the inclined plane exerts a force that acts to counter the spring force supplied by return spring 118. As a result of this counter-action, both switch sheet 103 and rubber sheet 104 move toward the right-hand side of FIGS. 12 and 13. As a result, when lid 115 is rotatably closed toward equipment case 109, switch sheet 103 and rubber sheet 104 are slid, in a synchronization with lid 115, into a retracted position and key tops 102 are lowered toward support plate 107.

During closing, dome-like rubber elastic portion 114 and switch portion 103a retract into the lower portion of a housing concave portion 116 formed in key top 102. Also during closing, an upward projection 104a, projecting from rubber sheet 104 and located near the lower leg portion of first link member 101a, contacts first link member 101a and forces cross link 101 into a retracted position as rubber sheet 104 slides leftward, as shown in FIG. 14. Thus, simultaneous with the motion of elastic portion 114 and cross link 101, key tops 102 move into the retracted position, reduce the overall height of keyboard switch 100, and allow keyboard switch 100 to fit within equipment case 109.

It should be recognized that, while key top 102 move downward into the retracted position, switch portion 103a remains deactivated. It should also be noted, that when key top 102 is in a retracted position, elastic portion 114 maintains an un-compressed state within concave portion 116, thus reducing the material fatigue and increasing the operational life of elastic portion 114.

During opening, lid 115 is rotated away key tops 102 and cam projection 117 loses contact with switch sheet 103 and rubber sheet 104. As cam projection 117 loses contact with switch sheet 103 and rubber sheet 104, return spring 118 forces both switch sheet 103 and rubber sheet 104 leftward into the operation position shown in FIG. 13. In the operational position, key top 102 is supported by elastic portion 114 through cross link 101.

It should be additionally noted that the above-described action of conventional keyboard switch 100, shows one possible way to reduce the thickness of the equipment case 109 and hence the overall thickness of a notebook-type personal computer. It should also be noted that in conventional keyboard switch 100, switch portion 103a is not activated during the closing motion and elastic portion 114 is kept in an extended state.

Additionally, in the conventional keyboard switch 100, the inclined plane of cam projection 117 both horizontally and vertically presses on the contact surface of switch sheet 103 and rubber sheet 104. While the horizontal-pressing motion of cam projection 117 is generally desirable in this device to activate key tops 102, the vertical- pressing motion subjects switch sheet 103 and rubber sheet 104 to undue stress and fosters the formation of an undesirable warp along the contact surface of both sheets. Consequently, it is very difficult to achieve either a smooth sliding motion as lid 115 rotates relative to equipment case 109 or sufficient durability in switch sheet 103 and rubber sheet 104.

Moreover, while the horizontal-pressing motion of cam projection 117 is generally desirable to activate key tops 102, the horizontal-pressing motion also subjects switch sheet 103 and rubber sheet 104 to a compressive stress in the sliding direction. This compressive stress fosters the formation of an undesirable warp throughout flexible switch sheet 103 and rubber sheet 104. A reinforcing lining sheet 121, made of metal, is applied to the back surface of switch sheet 103 and rubber sheet 104 to counteract the formation of this undesirable warp. Unfortunately, lining sheet 121 increases the overall thickness of keyboard switch 100 which results in an increase in the overall thickness of a notebook-type personal compute and an increase in cost.

Furthermore, return spring 118 requires a relatively heavy spring-force to operate switch sheet 103 and rubber sheet 104 between the operational position and the retracted position and creates an increasingly complex construction.

OBJECTS AND SUMMARY OF THE INVENTION

It is an object of the present invention to provide an improved keyboard switch that offers durability while requiring only moderate physical force during an opening and closing operation.

It is another object of the present invention to provide an improved keyboard switch that does not require a return spring and thus retains a simplified configuration.

It is another object of the present invention to provide an improved keyboard switch that allows a thin flexible sheet to reciprocate in synchronization with an opening and closing motion of a lid.

The present invention relates to a keyboard switch including an improved interlock mechanism that actuates a switch sheet from a first position to a second position and correspondingly narrows a gap between a key top and the switch sheet. The interlock mechanism converts a rotary motion from a device lid to a linear motion for the switch sheet guided by a slider block slidably retained in a device case.

According to an embodiment of the present invention there is provided an a keyboard switch, comprising: a support plate supporting a plurality of keys inside a device case; an interlock moving the keys from a first to a second position; the interlock including a cylindrical cam that rotates about a pivot shaft; the pivot shaft rotatably fixed in a bearing plate for pivotally connecting the cylindrical cam to an equipment case, the cylindrical cam including a radial interlocking plate for pivotally connecting the cylindrical cam to an equipment lid, the cylindrical cam including a cylindrical body, the cylindrical body including a cam grove, a slider having a follower fitting slidably inside the cylindrical cam and movably captured in the cam grove, the slider having a slider body extending away from the cylindrical cam, the slider including a slider block, the slider block extending perpendicularly from the slider body, the slider block slidably engaging a guide grove formed in the equipment case, an rigid angle plate fixedly attached to the slider, a switch sheet fixedly attached to the angle plate allowing the switch sheet to slidably reciprocate with the angle plate, and the interlock causing the switch sheet to slidably reciprocate in response to rotational operation of the lid whereby the interlock converts the rotational motion to a linear motion.

According to another embodiment of the present invention there is provided a keyboard switch, further comprising: a short portion, a long portion, and a coupling piece included in the rigid angle, the long portion extending perpendicular to the short portion, the switch sheet fixedly attached between both the short and the long portions, the coupling piece extending perpendicular from the long portion, and the coupling piece fixedly attached to the slider whereby transmitting the linear motion to the switch sheet is accomplished without crimping the switch sheet.

According to another embodiment of the present invention there is provided a keyboard switch, further comprising: at least one hole in the long portion, at least one rivet affixing the long portion to a first side of the switch sheet through the hole, a U-shaped portion on the short portion, and the U-shaped portion fixably engaging an orthogonal side of the switch sheet whereby the switch sheet is affixed between the first and second sides.

According to another embodiment of the present invention there is provided a keyboard, comprising: at least one keyboard switch in the keyboard, a keyboard cover, means for actuating the at least one keyboard switch to a retracted position in response to closing the keyboard cover, the means for actuating including a coupling piece, the means for actuating further including a cam actuated by the closing to displace the coupling piece, a first guide element affixed to the coupling piece, a second guide element affixed to the keyboard, and the first and second guide elements being effective for guiding displacement of the coupling piece, whereby precise retraction of the at least one keyboard switch is attained when the keyboard cover is closed.

According to another embodiment of the present invention there is provided a keyboard, further comprising: a plurality of keyboard switches in the keyboard, and the means for actuating retracting the plurality of keyboard switches to the retracted position in response to closing the keyboard cover.

According to another embodiment of the present invention there is provided a keyboard, wherein: the first guide element is a slider block, the slider block extending away from the coupling piece, the slider block being substantially shaped as a parallelepiped having a first and a second side, and the slider block and the second guide element are effective -for guiding displacement of the coupling piece, whereby precise retraction of the plurality of keyboard switches is attained when the keyboard cover is closed.

According to another embodiment of the present invention there is provided a keyboard, wherein: the second guide element is guide groove, the guide groove shaped to slidably receive the slider block, the guide grove contacting the first and second side of the slider block, and the slider block sliding in the guide grove in response to closing the keyboard cover whereby precise retraction of the plurality of keyboard switches is attained when the keyboard cover is close.

In this construction, the switch sheet is guided along the sliding direction by the supporting projection loosely received in a slit in the switch sheet. This eliminates the need for an extra guiding member.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
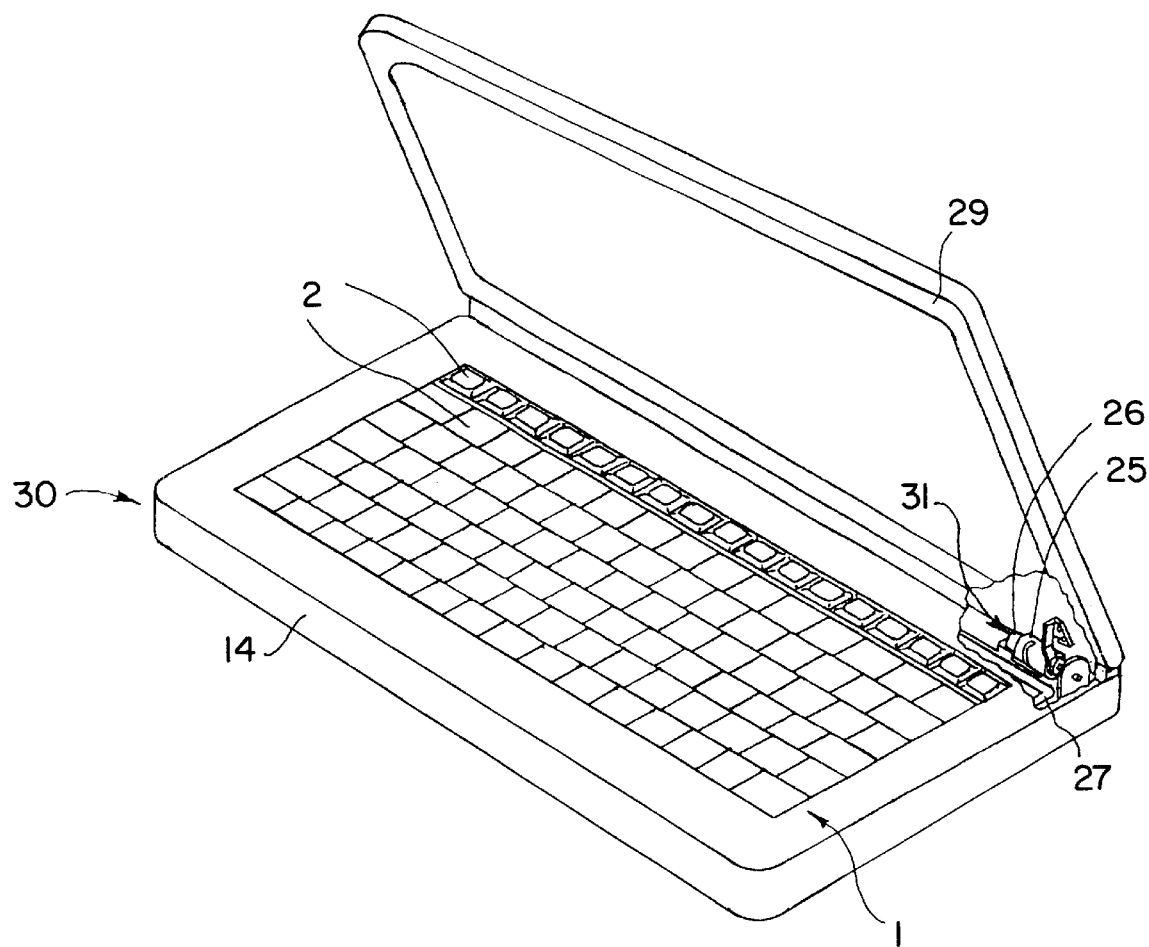
FIG. 1 is a perspective view illustrating a notebook-type personal computer according to an embodiment of the present invention.

Referring now to FIG. 1, a notebook-type personal computer 30 includes a lid 29 rotatively coupled to an equipment case 14 containing a keyboard switch 1. Lid 29 is rotatively coupled to equipment case 14 by a cylindrical cam 31 linked to an angle plate contained in the equipment case 14. Cylindrical cam 31 includes a slider 26 and a cylinder 25 and operates lower keyboard switch 1 from an operational position into a retracted position, into equipment case 14 in response to a lid 29 closing motion, as will be explained.

Figure 2:
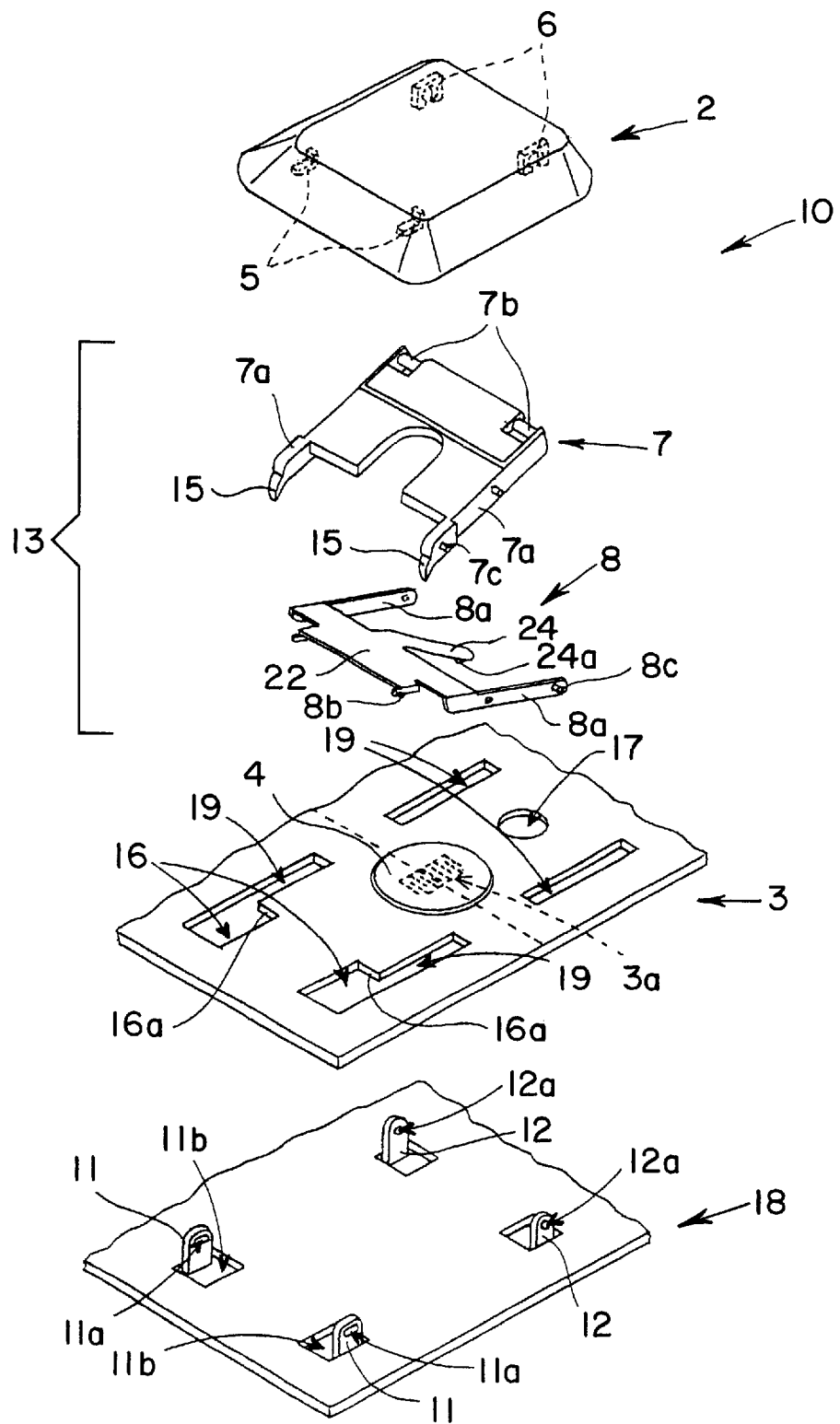
FIG. 2 is an exploded view illustrating an embodiment of the present invention.

Additionally referring now to FIG. 2, keyboard switch 1 includes a number of a key switches 10 arranged in arrayed and formed on the top surface of a rectangular support plate 18 made of a suitable flexible material such as sheet metal, synthetic resin, or other ceramic materials.

Key switch 10 includes a key top 2, a cross-link 13, a switch sheet 3 containing a switch portion 3a, and a support plate 18. Switch sheet 3 is built as a flexible sheet and slides on support plate 18, as will be explained. Key top 2 is formed as a molded part from a synthetic resin material such as ABS resin. Key top 2, has a pair of U-shaped bearing portions 6 formed integrally on a rear-end portion of a bottom surface of key top 2. Key top 2 also has a pair of guide bearing portions 5 formed integrally on a front-end portion of a bottom surface of key top 2.

Bearing portions 6 rotatively attach key top 2 to cross-link 13, and guide bearing portions 5 both slidably and rotatively attach key top 2 to cross-link 13, as will be explained.

Cross-link 13 includes an inner link 7 and an outer link 8. Inner link 7 includes a pair of integral arm portions 7a, a pair of pivot shafts 7b pivotably linked to bearing portions 6, and a pair of slidable projections 7c. Outer link 8 includes a pair of integral arm portions 8a, a pair of slidable projections 8b linked to guide bearing portions 5, and a pair of pivot shafts 8c. Inner link 7 and outer link 8 are rotatable together and intersect at the center of arm portions 7a, 8a. It is important to note, that both inner link 7 and outer link 8 have one end built as a hinged portion (7b and 8c) and one end built as a slidable-and-hinged moving end portion (7c and 8b).

Inner link 7 is rotatably and slidably supported on a first side by slidable projection 7c formed as a projection on the side of arm portion 7a and are slidably and rotatively retained in an elongated slot 11a, piercingly formed in the front-side portion of a pair of front supporting projections 11, as will be explained. Arm portions 7a extend beyond slidable projections 7c into a pair of pawl pieces 15, as will be explained. Inner link 7 is rotatably supported on a second end by pivot shafts 7b received in bearing portions 6. Pawl pieces 15 are contiguously formed from arm portions 7a in an arc-shape and positioned obliquely below sliding parts 7c.

Outer link 8 is rotatably and slidably supported on a first end by slidable projection 8b protruding from coupling plate 22 formed between arm portions 8a, and slidably and rotatively retained in guide bearing portions 5. Outer link 8 is rotatably supported on a second end by pivot shafts 8c, protruding from arm portion 8a and loosely received in a pair of circular holes 12a piercingly formed in a pair of rear supporting projections 12, as will be explained.

Cross link 13 attaches key top 2 to a support plate 18 by front supporting projections 11 and rear supporting projections 12 that are cut and raised from support plate 18. When front and rear supporting projections 11, 12 are cut and raised from support plate 18, a pair of corresponding front and rear cut-out openings 11b, 12b remain. In this manner, key top 2 is linked by cross link 13 to support plate 18 so that during actuation of key top 2, key top 2 is maintained in a generally horizontal plane relative to support plate 18.

Outer link 8 includes a strip-like spring piece 24, formed integrally with coupling plate 22, and extending obliquely downwards away from key top 2. Spring piece 24 has a free end formed opposite coupling plate 22. On the free end, is formed an abutting portion 24a, molded to protrude in a conical form and shaped to come into elastic contact with switch portion 3a of membrane switch sheet 3, as will be explained.

Membrane sheet 3 is composed of an upper plastic sheet, a lower plastic sheet, and an insulating spacer sheet all superimposed together. The upper plastic sheet, has a moving contact and a route pattern therefor is printed on its back surface. The lower sheet, has a fixed electrode and a route pattern therefor printed on its top surface. The insulating spacer sheet is interposed between the upper and lower plastic sheets. The sheets are bonded together through their interfaces with adhesive and formed into rectangular, three-layer laminated flexible sheets. The insulating spacer sheet has a circular opening piercingly formed in a position on its surface where the moving and fixed contacts of the upper and lower plastic sheets are printed. Through the circular opening, the moving and fixed contacts face each other with a minimum interval secured therebetween to form switch portion 3a.

On membrane switch sheet 3, is a dish-shaped spring 4 [hereinafter called dish spring 4] formed in the shape of a disk and made from an elastic metal plate. Dish spring 4 has an outer rim periphery fixed to switch sheet 3 above switch portion 3a.

Switch sheet 3 is superimposed on and aligned along the length direction of support plate 18. Switch sheet 3 is reciprocally slidable along support plate 18 in its length direction. Switch sheet 3 has a pair of guide slits 19 formed to slidably receive front supporting projections 11 and a second pair of guide slits 19 formed to receive rear support projections 12. Guide slits 19 are formed along the length direction of support plate 18, and enable switch sheet 3 to slide relative to support plate 18 without interference from front and rear supporting projections 11 and 12. Guide slits 19 are slightly wider than the thickness of front and rear supporting projections 11 and 12, and allow switch sheet 3 to be guided by supporting projections 11 and 12 and thereby freely slide along support plate 18.

A pair of engagement openings 16 extend from the pair of front-side guide slits 19. Each engagement opening 16 has a corresponding rear edge 16a. Engagement openings 16 are formed in switch sheet 3 to receive pawl pieces 15 extending from inner link arm portions 7a. During retraction of key switch 10, rear edges 16a abut pawl pieces 15 and exert force on arm portions 7a of cross link 13 thereby bringing key switch 10 into a retracted position, as will be further explained. During operation of key switch 10, pawl pieces 15 extend into front cut-out openings 11b thereby allowing key switch 10 to extend into the operational position, as ill be further explained.

A circular opening 17 is formed on switch sheet 3 between the rear-side guide slits 19 and beyond dish spring 4. Circular opening 17 accommodates abutting portion 24a of spring piece 24 as switch sheet 3 slides into the retracted position. As a result, key switch 10 is able to help achieve a narrow retracted position without exerting upward pressure on key top 2 through cross link 13.

Figure 3:
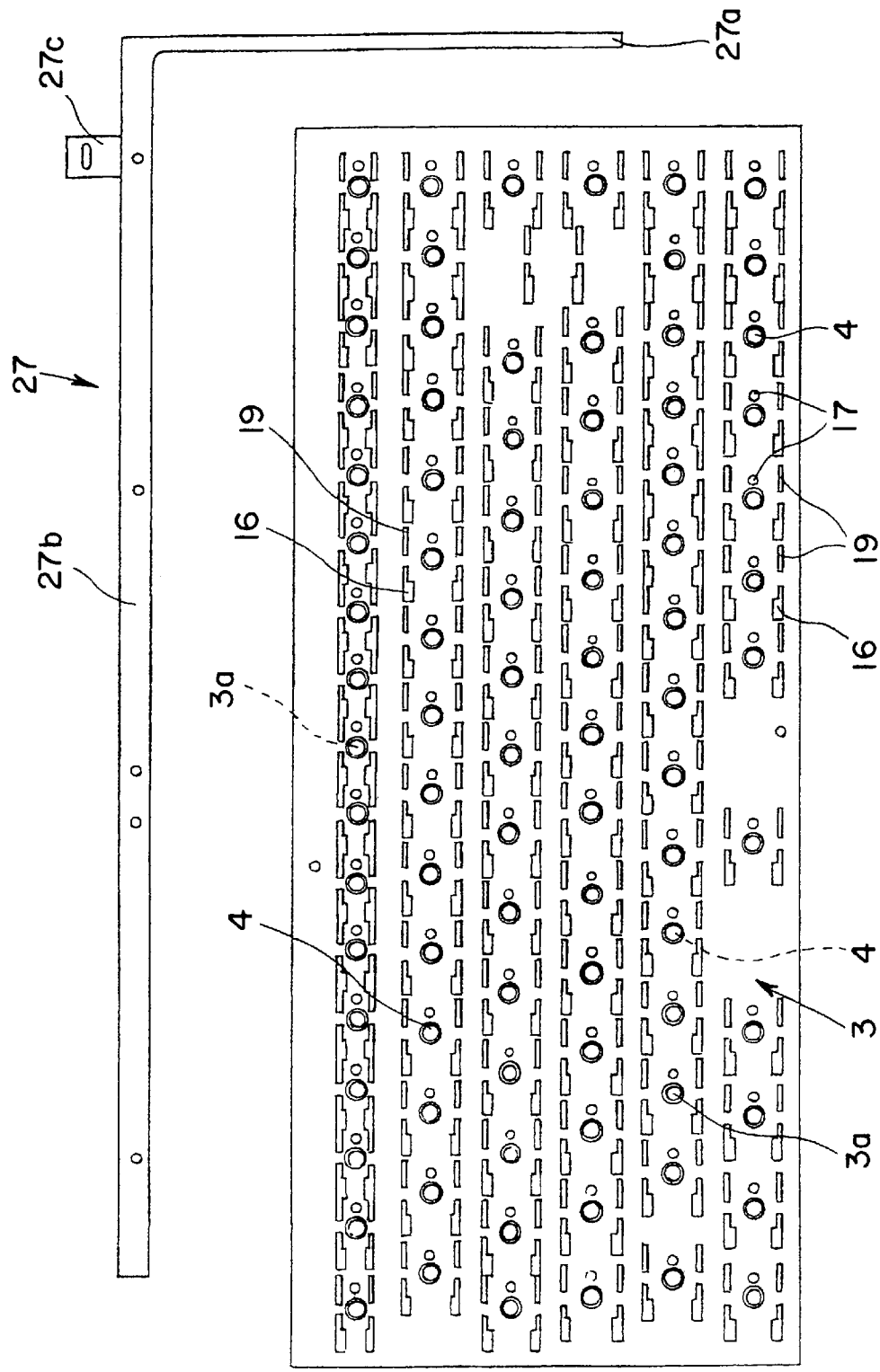
FIG. 3 is a plan view illustrating the structure of a angle plate and a membrane switch sheet according to an embodiment of the present invention.
Figure 4:
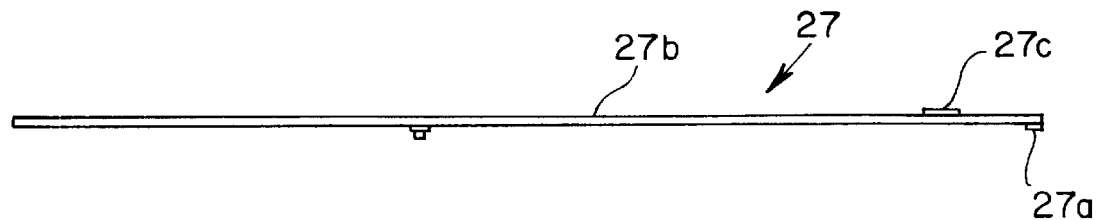
FIG. 4(A) is a plan view illustrating an angle plate according to an embodiment of the present invention.
FIG. 4(B) is a plan view illustrating an angle plate according to an embodiment of the present invention.
Figure 4:
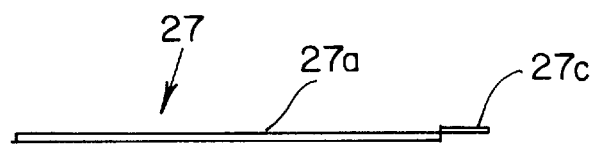
Figure 14:
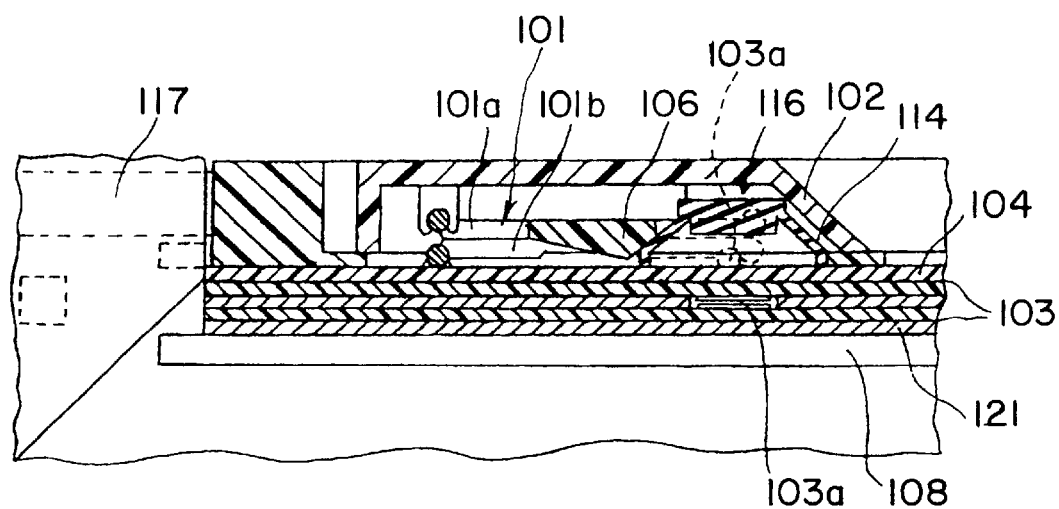
FIG. 14 is a vertical sectional view illustrating the principal portions of a keyboard switch in a retracted position.
Figure 5:
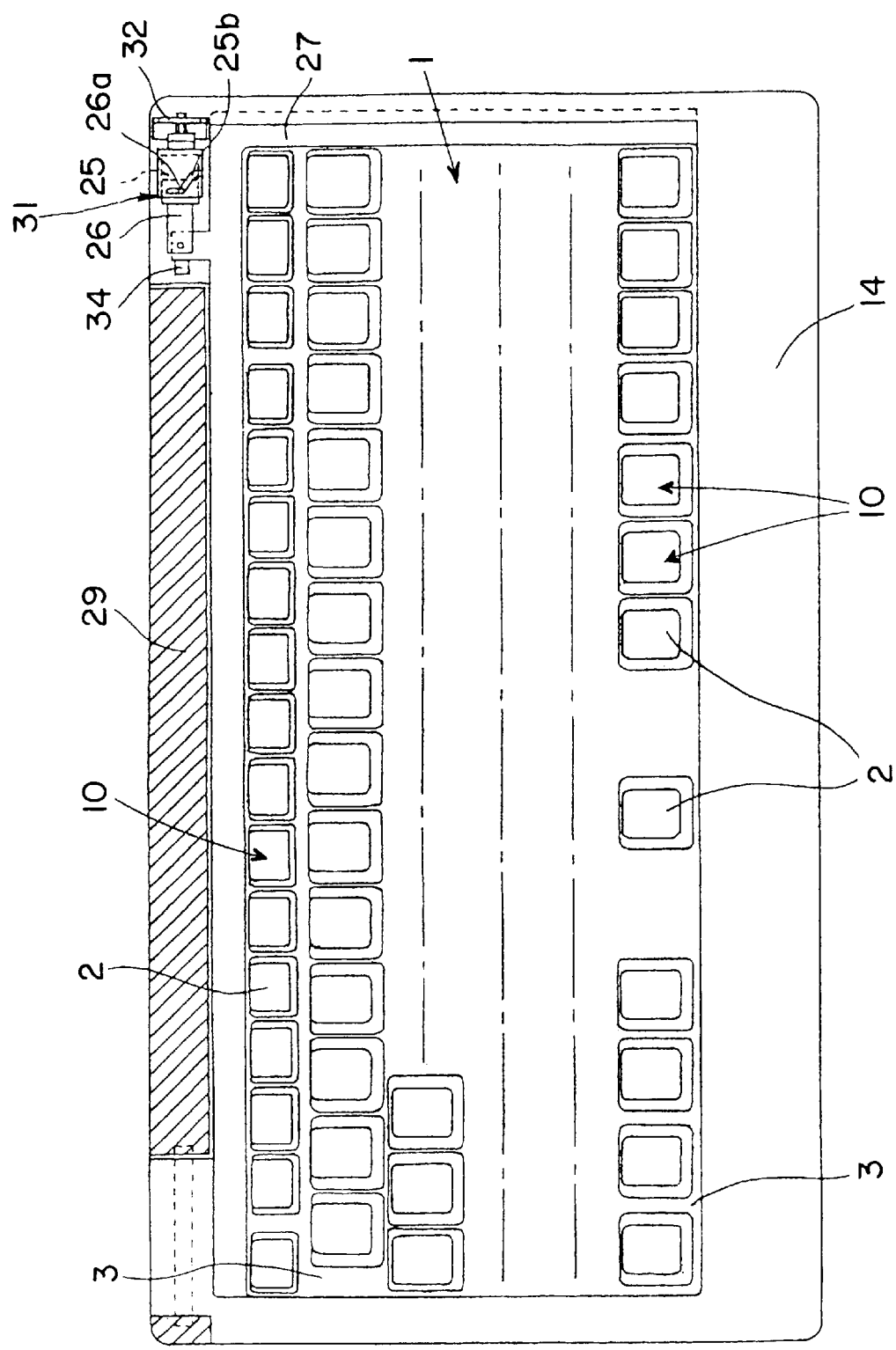
FIG. 5 is a plan view illustrating the keyboard switch according to an embodiment of the present invention.

Additionally referring now to FIGS. 3, 4, and 5, an angle plate 27 is affixed to switch sheet 3 along its upper edge and right edge relative to FIG. 3. Angle plate 27 is built as a frame-shaped linked portion from metal generally having an inverted L-shape. Angle plate 27 has a short-side portion 27a, a long-side portion 27b, and a coupling piece 27c extending from angle plate 27. Short side portion 27a has an edge folded back upon itself in a general U-shape to enable it to affix to the right edge of switch sheet 3. Long side portion 27b is affixed to the upper edge of switch sheet by a rivet or other means passing through multiple holes formed in long side 27b. It should be understood, that angle plate 27 may be fixed to switch sheet 3 in multiple ways as long as a left-right motion of angle plate 27 slides switch sheet 3 in a corresponding manner. It should be further understood that while switch sheet 3 is a flexible sheet, since its upper and right sides are affixed to rigid angle plate 27, switch sheet 3 is not generally subject to local stresses during sliding movement, and thus the risk of warp occurring on switch sheet 3 is minimized.

Coupling piece 27 is coupled to a slider 26 attached to a cylindrical cam 31, as will be described. Slider 26 transmits the action of cylinder cam 31 to coupling piece 27. During actuation, angle plate 27 slides switch sheet 3 to the left and right in FIG. 3, thereby sliding switch sheet 3 in a corresponding direction relative to support plate 18. As a result, cross link 13 and key top 2 are actuated and move key switch 10 between the raised operational position and the lowered retracted position.

An interlocking mechanism is coupled between lid 29 and equipment case 14 and transmits the rotary opening and closing operation of lid 29 through cylinder cam 31 into rectilinear reciprocating motion of angle plat 27 to switch sheet 3. Cylinder cam 31 includes a cylinder 25 and slider 26. Cylinder 25 rotates around a pivot shaft 25c (later shown) parallel to the direction of the length of equipment case 14. Slider 26 is loosely fitted in cylinder 25 and has a follower 26a protruding therefrom to engage a cam grove 25b formed in cylinder 25.

Figure 6:
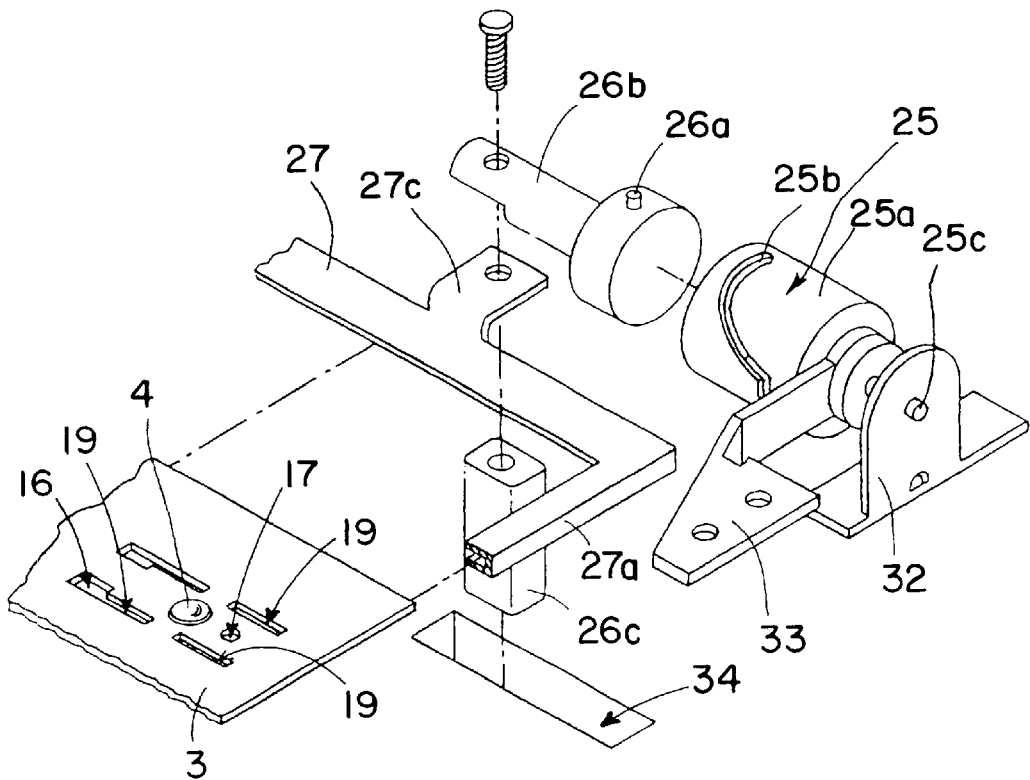
FIG. 6 is an enlarged exploded view illustrating the interlocking mechanisms according to an embodiment of the present invention.
Figure 7:
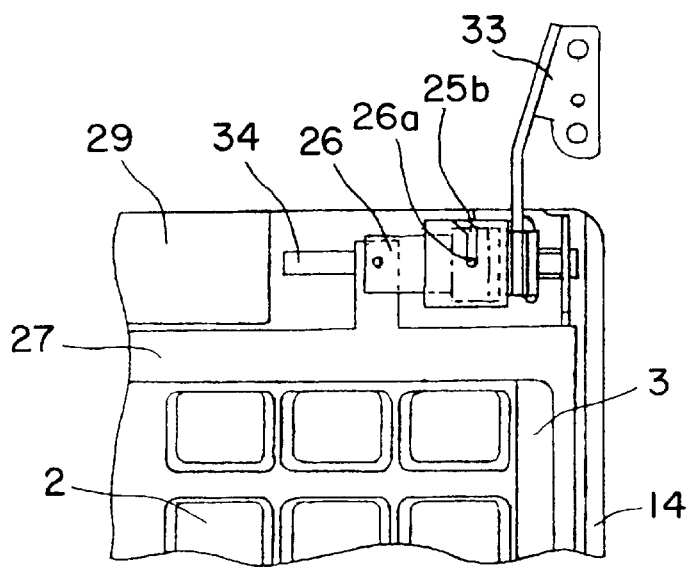
FIG. 7 is an enlarged plan view illustrating the interlocking mechanisms according to an embodiment of the present invention.

Additionally referring now to FIGS. 6 and 7, the cylinder cam 31 of the interlocking mechanism includes cylinder 25 containing a cylindrical body 25a having cam grove 25b formed through the wall of cylindrical body 25a. Cylinder 25 is rotationally attached to pivot shaft 25c. Pivot shaft 25c is normally made of metal and is inserted through a bearing plate 32 attached to and extending upwardly from equipment case 14. As a result, cylinder 25 is rotationally supported on bearing plate 32 and affixed to equipment case 14. An interlocking plate 33 is fixed on a first end to the periphery of an intermediate portion of pivot shaft 25c. Interlocking plate 33 is fixed on a second end to the rear side of lid 29 so that the rotation of lid 29 is transmitted to pivot shaft 25c. It is to be understood that interlocking plate 33 may be fixed to lid 29 in multiple ways to transmit the rotary motion of the lid to cylinder 25.

Slider 26 includes follower 26a, a slider body 26b, and a slider block 26c. Slider body 26b has a generally cylindrical shape so as to be loosely received inside cylinder 25. Follower 26a is generally shaped as a circular pin or bulged portion and engages cam grove 25b of cylinder 25 to transmit the motion of cylinder 25 to slider 26. Slider block 26c is shaped generally as a parallelepiped and is affixed to a bottom portion of slider body 26b through coupling piece 27c of angle plate 27 generally by means of a screw or threaded bolt. As a result, slider block 26c fixes coupling plate 27 to slider 26 and cylinder 25.

A guide grove 34 is concavely formed in a top surface of equipment case 14 in a length direction of equipment case 14 parallel to the axial direction of pivot shaft 25c of cylinder 25. Guide grove 34 loosely receives slider block 26c, and reciprocally guides slider block 26c in the length direction of equipment case 14, parallel to the axial direction of cylinder 25c.

As a result, when lid 29 is rotated, slider 26 is moved reciprocally and rectilinearly along the direction of the length of equipment case 14. In synchronization with the movement of slider 26, switch sheet 3 slides reciprocally with angle plate 27 between the retracted position and the operational position.

In the operational position, with lid 29 in an open state, slider body 26b of slider 26 is rotationally accommodated inside cylindrical body 25a of cylinder 25, and switch sheet 3 is kept in the operational position. In the retracted position, with lid 29 in a closed state, slider body 26 is directed outward from cylindrical body 25 also forcing angle plate 27 guided by slider block 26c away from cylinder 25.

Figure 8:
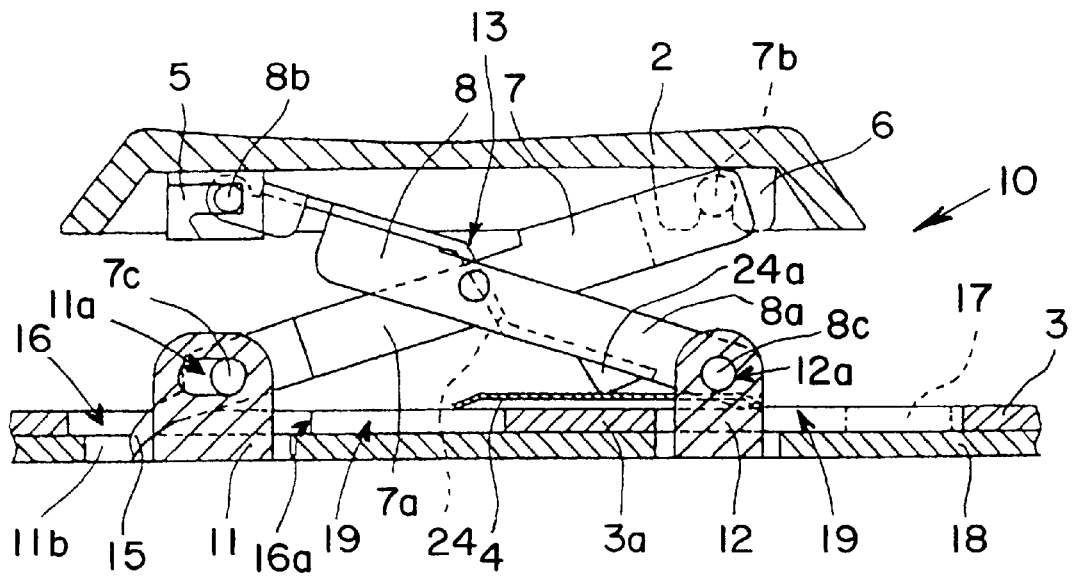
FIG. 8 is a sectional view of a key switch in an operational position according to an embodiment of the present invention.

Additionally referring now to FIG. 8, key switch 10 is shown in the operational position in a stand-by state, without downward pressure on key top 2. Dish spring 4 is located above switch portion 3a to abut against abutting portion 24a under adequate resilient force to project cross arms 13 upward and bring key top 2 to its highest position. As a result, abutting portion 24a of spring piece 24 does not depress dish spring 4 and a switch portion 3a of switch sheet 3 is not activated and an 'OFF' operation of switch portion 3a occurs.

Figure 9:
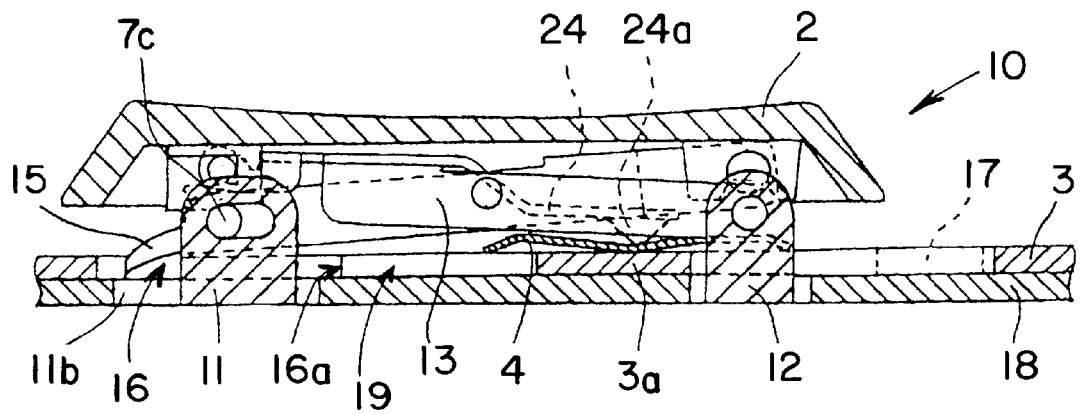
FIG. 9 is a sectional view of a key switch depressed in an operational position according to an embodiment of the present invention.

Additionally referring now to FIG. 9, pressure is applied to key switch 10 the operational position, and key top 2 is pressed downward to an activated-state. As key top 2 is moved downward, cross link 13 keeps key top 2 generally horizontal to support plate 18, and force is transmitted through outer link 8 and coupling plate 22 to spring piece 24. As force is applied to spring piece 24, abutting portion 24a presses on and deforms dish spring 4. As dish spring 4 deforms switch portion 3a of switch sheet 3 is activated and key switch 10 achieves the activated-state and an 'ON' operation of switch portion 3a occurs. Upon release of the downward pressure, dish spring 4 elastically returns to its original position, deactivates switch portion 3a, and elastically presses spring piece 24 and cross link 13 upward, returning key top 2 to its operational position.

Figure 10:
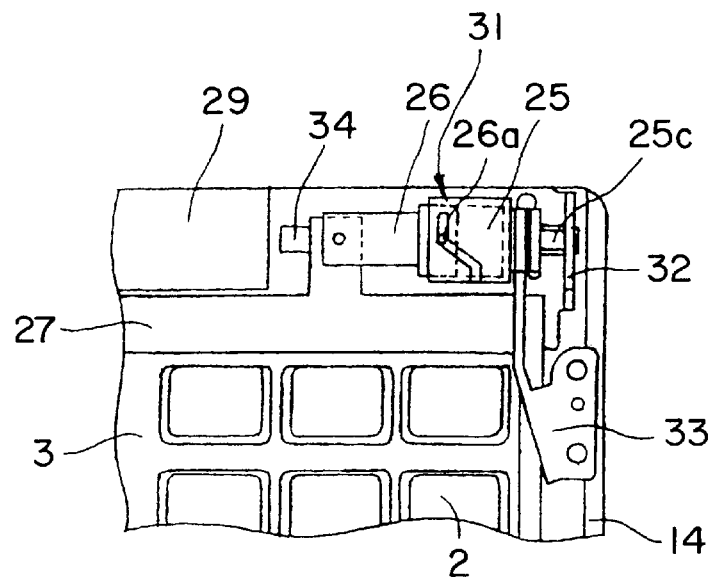
FIG. 10 is an enlarged plan view illustrating the interlocking mechanisms according to an embodiment of the present invention.
Figure 11:
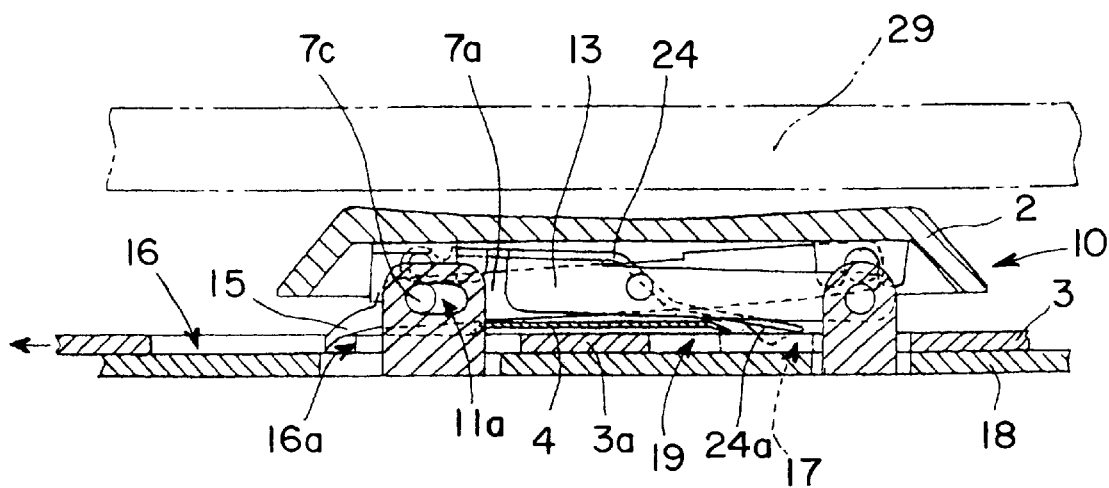
FIG. 11 is a sectional view of the key switch in a retracted position according to an embodiment of the present invention.
Figure 12:
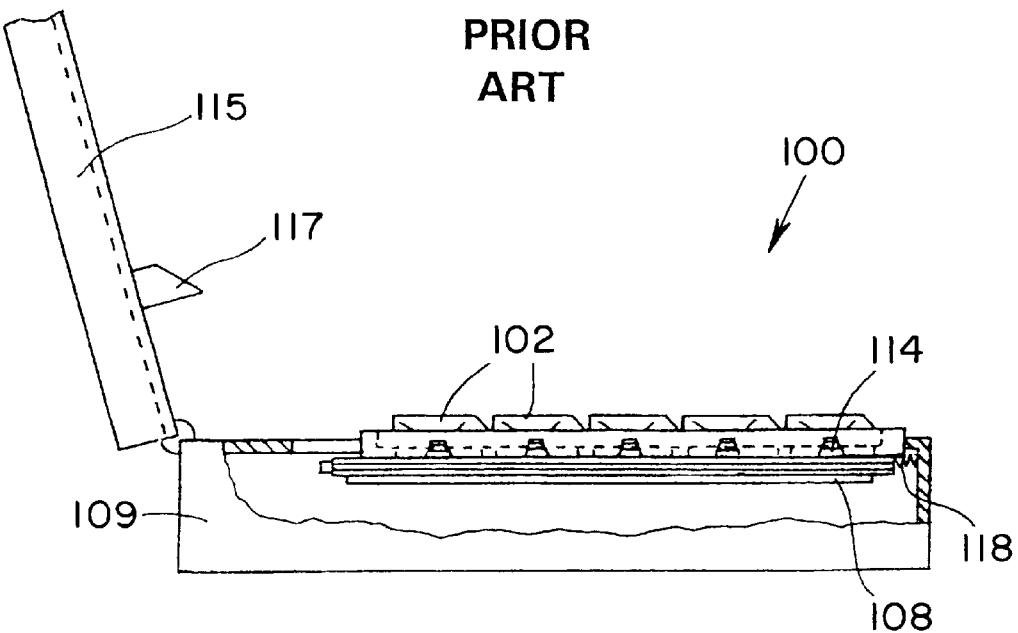
FIG. 12 is a partially front view illustrating the structure of a conventional keyboard switch.
Figure 13:
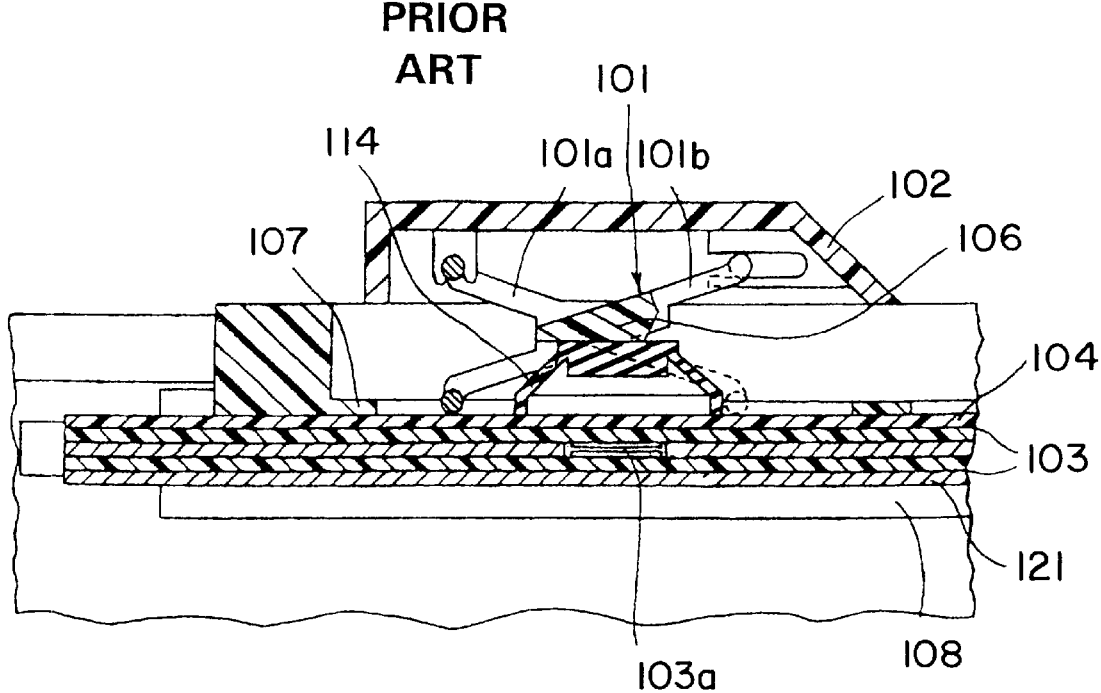
FIG. 13 is a vertical sectional view illustrating the principal portions of a conventional keyboard switch in an operational position.

Additionally referring now to FIGS. 10 and 11, cylinder cam 31 is rotatably attached to interlocking plate 33 shown here without cover 29. FIG. 10 shows the interlocking mechanism for keyboard switch 1 in a retracted state with slider 26 projected axially outward(away) from cylinder 25 by a sliding interaction between follower 26a and cam grove 25b. As slider 26 is projected axially outward from cylinder 25, cylinder body 26b which is attached to angle plate 27 and guided by slider block 26c sliding in guide grove 34 along the length of support plate 18. As angle plate 27 slides, switch sheet 3 is guided by and slides past front and rear support projections 11, 12, to the left in FIG. 11.

As switch sheet 3 slides to the retracted position, rear edges 16a of engagement openings 16, engage pawl pieces 15 and rotate arm portions 7a of inner link 7 in a clockwise about slidable projections 7c. As cross link 13 retracts. slidable projections 7c both slide and rotate within elongated slots 11a and slidable projections 8b both slide and rotate within guide bearing portions 5. As a result, cross link 13 moves into a retracted position.

As cross link 13 further slides to the retracted position, abutting portion 24a of spring piece 24 slides from dish spring 4 into retracting opening 17 of switch sheet 3. Further, as switch sheet 3 slides leftward in FIG. 11, switch portion 3a protected by dish spring 4 also slide leftward. As a result, dish portion 4 is not elastically deformed and fatigue and plastic deformation is minimized. As a further result, switch sheet 3a is protected from unintended activation and damage.

As lid 29, and interlocking plate 33 are rotated open to allow active use of keyboard switch 1, slider 26 moves inward toward cylinder 25 to an operational position. Through the opening motion of lid 29 and locking plate 33, the rotational motion is transferred by the interlocking mechanism with angle plate 27 to slide switch sheet 3 to the operational position (to right in FIG. 11). Thus, switch sheet 3, in synchronization with the opening movement slides from the retracted position to the operational position and eliminates the need for an additional spring mechanism to provide a shifting force.

Further, as switch sheet 3 slides, rear edges 16a no longer contact pawl pieces 15 and spring piece 24 is slid from retracting opening 17. As a result, abutting portions 24a elastically contact dish springs 4 and project cross links 13 upward to restore key tops 2 and keyboard switch 1 to the operational position.

The present invention provides multiple benefits. First, it should be appreciated that during the above-described reciprocating movement, membrane switch sheet 3 is not subjected to undesirable warp, nonlinear stress, or bending motions. As a result, each switch portion 3a enjoys extended life and can be made thinner and lighter thus providing a lighter overall product.

Second, it should be appreciated that front and rear side supporting projections 11, 12 provide guidance to switch sheet in addition to that provided by angle plate 27. As a result, switch sheet 3 is able to slide smoothly and securely along supporting plate 18.

Third, it should be appreciated that while angle plate 27 currently attaches to switch sheet 3 on the upper and right sides, all sides or any combination of sides may be connected to the interlocking mechanism to effect the reciprocating sliding motion. As a result, multiple options are provided to manufacturers and customers in designing adaptively shaped equipment cases 14.

Fourth, it should be appreciated that when keyboard switch 1 is accommodated inside device case 14, key tops 2 may be kept in a lowered state without the need for an additional complicated retaining structure. According, the complete notebook-type personal computer 30 may be constructed in a lighter and cheaper manner. Additionally, since key tops 2 retract, notebook-type personal computer 30 may be made thinner and lighter and without the risk of damage to either a viewing screen (usually a liquid-crystal display) or key tops 2.

Fifth, it should be appreciated that using the interlocking mechanism to change rotational motion into linear motion no additional return spring is necessary to return key tops 2 to their fully raised operational position. As a result, notebook-type personal computers 30 may be made more simply and less expensively with a lower risk of stress or elastic failure.

Sixth, it should be appreciated that since spring pieces 24 are removed from elastic contact with dish spring 4 or switch portion 3a, and retracted into retracting opening 17, the risk of fatigue or plastic failure of spring piece 24, dish spring 4 and switch portion 3a are reduced. Accordingly, equipment reliability and customer satisfaction are increased.

It should be also noted that various changes and modifications may be made in the construction of each component constituting the key switch 10 without departing from the spirit of the present invention. For example, here, the plate spring piece 24 for restoring the key top 2 to its original position also serves as an actuator for driving the switch portion 3a to operate. However, it is also possible to provide, apart from the plate spring piece 24 acting as a return spring, an actuator for applying downward pressure to the switch portion 3a in the key top 2 or in the cross link 13.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A keyboard switch, comprising:

a support plate supporting a plurality of keys inside a device case;

an interlock moving said keys from a first to a second position;

said interlock including a cylindrical cam that rotates about a pivot shaft;

said pivot shaft rotatably fixed to a bearing plate pivotally connecting said cylindrical cam to said device case;

said cylindrical cam including a radial interlocking member pivotally connecting said cylindrical cam to a device lid;

said cylindrical cam including a cylindrical body;

said cylindrical body including a cam grove;

a slider having a follower fitting slidably inside said cylindrical cam and movably captured in said cam grove;

said slider having a slider body extending away from said follower;

said slider including a slider block extending away from said slider body;

said slider block slidably engaging a guide grove formed in said device case;

a rigid angle plate affixed between said slider body and said slider block;

a switch sheet rigidly affixed to said angle plate allowing said switch sheet to slidably reciprocate over said support plate wherein said angle plate and switch sheet reciprocate substantially in unison; and said interlock causing said switch sheet to slidably reciprocate in response to a rotational motion of said device lid whereby said interlock converts said rotational motion to a linear motion.

2. A keyboard switch, comprising:

a support plate supporting a plurality of keys inside a device case;

an interlock moving said keys from a first to a second position;

said interlock including a cylindrical cam that rotates about a pivot shaft;

said pivot shaft rotatably fixed to a bearing plate pivotally connecting said cylindrical cam to said device case;

said cylindrical cam including a radial interlocking member pivotally connecting said cylindrical cam to a device lid;

said cylindrical cam including a cylindrical body;

said cylindrical body including a cam grove;

a slider having a follower fitting slidably inside said cylindrical cam and movably captured in said cam grove;

said slider having a slider body extending away from said follower;

said slider including a slider block extending away from said slider body;

said slider block slidably engaging a guide grove formed in said device case;

a rigid angle plate affixed between said slider body and said slider block;

a switch sheet affixed to said angle plate allowing said switch sheet to slidably reciprocate over said support plate;

said interlock causing said switch sheet to slidably reciprocate in response to a rotational motion of said device lid whereby said interlock converts said rotational motion to a linear motion;

a short portion, a long portion, and a coupling piece included in said rigid angle plate;

said long portion extending perpendicular to said short portion;

said switch sheet affixed between said short and said long portions;

said coupling piece extending perpendicular from said long portion; and said coupling piece fixedly attached between said slider body and said slider block whereby said linear motion is transmitted from said slider body to said switch sheet without crimping said switch sheet.

3. A keyboard switch, according to claim 2, further comprising:

at least one hole in said long portion;

at least one rivet affixing said long portion to a first side of said switch sheet through said hole;

a U-shaped portion on said short portion; and said U-shaped portion fixably engaging a second side of said switch sheet whereby said switch sheet is affixed between said first and second sides.

4. A keyboard comprising:

at least one keyboard switch in said keyboard;

a keyboard cover;

means for actuating said at least one keyboard switch to a retracted position in response to closing said keyboard cover;

said means for actuating including a coupling piece;

said means for actuating further including a cam actuated by said closing to displace said coupling piece;

a first element affixed to said coupling piece;

a second guide element affixed to said keyboard;

said first and second guide elements being effective for guiding displacement of said coupling piece, whereby precise retraction of said at least one keyboard switch is attained when said keyboard cover is closed;

said first guide element is a slider block;

said slider block extending away from said coupling piece;

said slider block being shaped as a parallelepiped having a first and a second side; and said slider block and said second guide element are effective for guiding displacement of said coupling piece, whereby precise retraction of said at least one keyboard switch is attained when said keyboard cover is closed.

5. A keyboard according to claim 4, further comprising:

a plurality of keyboard switches in said keyboard; and said means for actuating retracting said plurality of keyboard switches to said retracted position in response to closing said keyboard cover.

6. A keyboard according to claim 4, wherein:

said second guide element is guide groove;

said guide groove shaped to slidably receive said slider block;

said guide grove contacting said first and second side of said slider block; and said slider block sliding in said guide grove in response to closing said keyboard cover whereby precise retraction of said plurality of keyboard switches is attained when said keyboard cover is close.

\* \* \* \* \*